June 4, 1935.   R. H. RANGER ET AL   2,003,552
AIR CONTROLLED SPEED REGULATOR
Filed May 2, 1927   2 Sheets-Sheet 1

INVENTORS
RICHARD HOWLAND RANGER
VERNE T. BRAMAN AND
BY CARL ERIC NELSON

ATTORNEY

June 4, 1935. R. H. RANGER ET AL 2,003,552
AIR CONTROLLED SPEED REGULATOR
Filed May 2, 1927   2 Sheets-Sheet 2

INVENTORS
RICHARD HOWLAND RANGER
VERNE T. BRAMAN
BY CARL ERIC NELSON

*Ira J. Adams*
ATTORNEY

Patented June 4, 1935

2,003,552

UNITED STATES PATENT OFFICE 2,003,552

AIR CONTROLLED SPEED REGULATOR

Richard Howland Ranger, Newark, N. J., and Verne T. Braman and Carl Eric Nelson, Brooklyn, N. Y., assignors to Radio Corporation of America, a corporation of Delaware Application May 2, 1927, Serial No. 188,377

36 Claims. (Cl. 188—180)

Our invention relates to an air operative means for controlling a motor or prime mover and is especially adapted for use in connection with the work of transmitting and receiving pictures by radio, although it is to be understood that the invention in its broadest aspects is broad enough to include all types of speed governing apparatus.

Broadly speaking the invention relates to a means for causing a governor mechanism to apply a brake to a motor to control the same, although the system is equally applicable to a use for directly controlling the energy supplied to the motor, or other form of prime mover, by the opening and closing of electrical contacts, or, if the prime mover be a steam engine, by controlling the amount of steam supplied, as well as other uses which are recognized throughout the arts and industries as being equivalent to those above set forth.

An object of our invention is to provide a novel means for controlling the speed of a prime mover by means of an air operated brake mechanism.

Still another object of our invention is to provide a means for controlling and closely regulating the speed of a prime mover by a substantially self-contained outfit in which all electrical contacts are omitted.

Still another object of our invention is to provide a means for controlling the speed of a prime mover which is applicable to all types of prime movers, for example, steam engines, and alternating or direct current motors, as well as various other types of installations.

Still another object of our invention is to provide a means of controlling the speed of a prime mover without the use of electrical apparatus, and thus prevent the cause of considerable interference in both radio and audioamplifying circuits, due, for example, to vibrating contacts and brushes.

Still another object of our invention is to provide a speed control mechanism which is self-starting and will operate as soon as energy is supplied to the prime mover.

Still another object of our invention is to provide a system wherein the speed of a prime mover is regulated through the utilization of the change in the phase relationship between the prime mover and a mechanical resonant system which forms a portion of our apparatus.

Still other objects of our invention are to provide in the manner herein set forth an air operative means which is free from electrical contacts for controlling prime mover speeds through a system which is relatively simple in its construction and arrangement of parts, as well as through a system which is durable, compact, efficient in its use, conveniently operated, readily set up, fool proof and comparatively inexpensive to install.

The novel features which we believe to be characteristic of our invention are set forth in the appended claims, the invention itself, however, both as to its organization and method of operation together with further objects and advantages thereof will be best understood by making reference to the following specification when read in connection with the accompanying drawings wherein:

Figure 1:
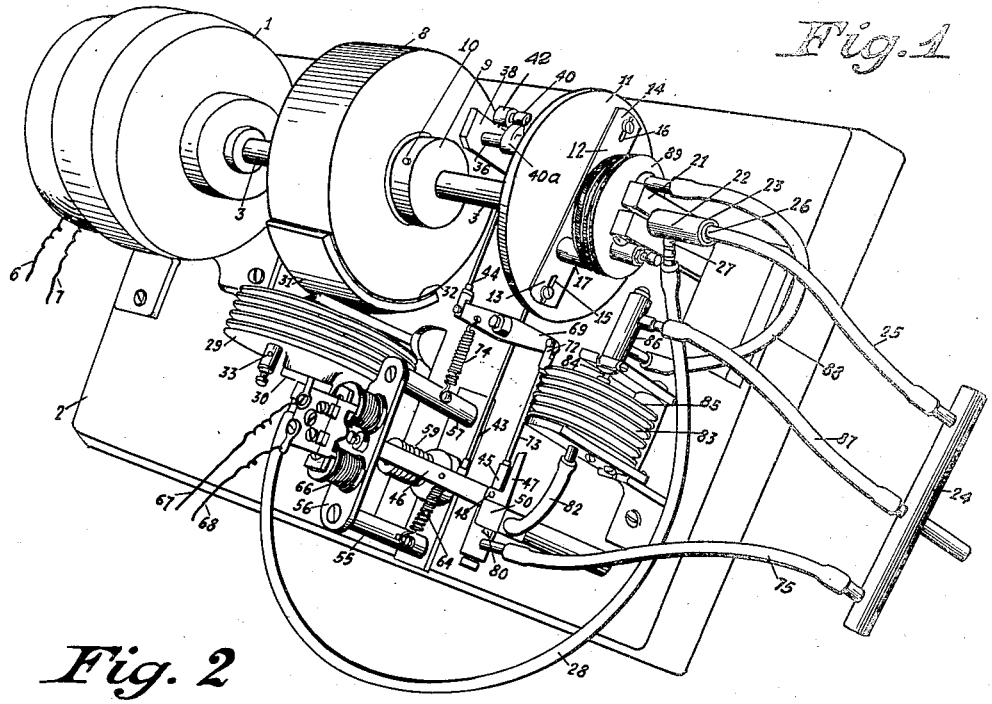
Fig. 1 is a perspective plan view showing the general arrangement of elements.
Figure 2:
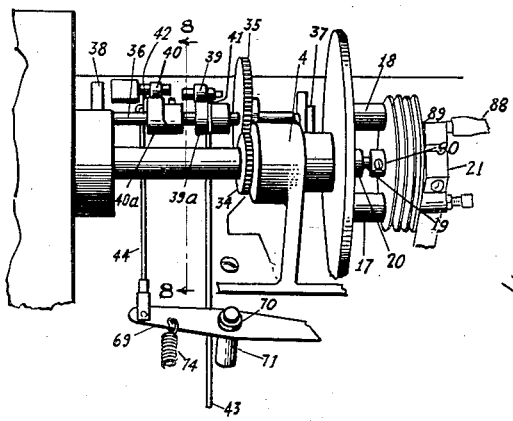
Fig. 2 is a detailed view showing the gear reduction and cam mechanisms for controlling the mechanical resonant system and the air supply valve to the amplifying bellows mechanisms as well to the governor mechanism.
Figure 3:
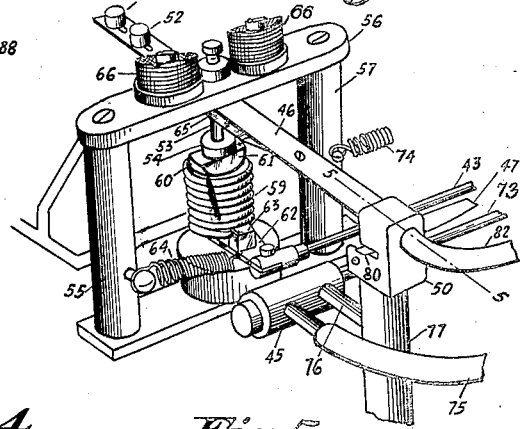
Fig. 3 is a detailed view of a part of Fig. 1 showing the mechanical resonant system consisting, in the present case, of a vibrating arm and connected spring, together with a portion of the driving means therefor.
Figure 6:
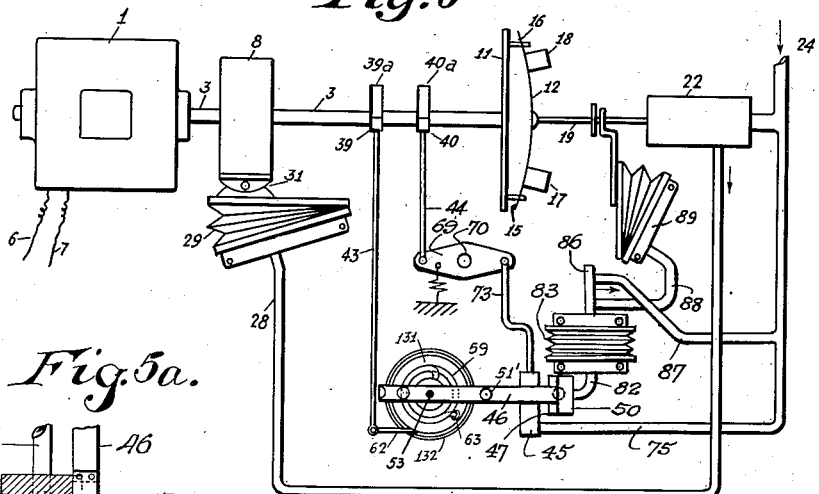
Figure 5A:
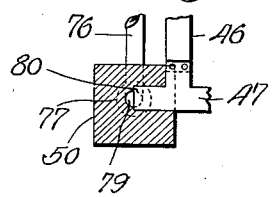
Fig. 5a is a segmental top plan view, partly in section taken on line 5a—5a of Fig. 5 showing the arrangement of the sector shaped valve plate with respect to the valve in a position of rest.
Figure 7:
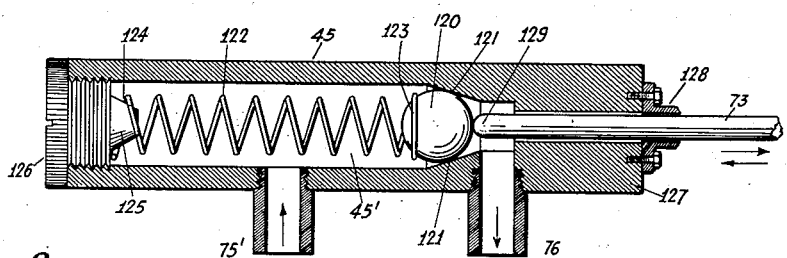
Figure 8:
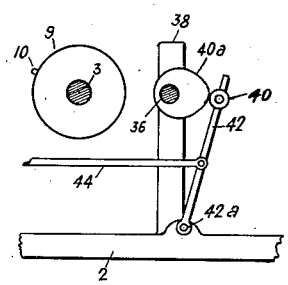
Figure 9:
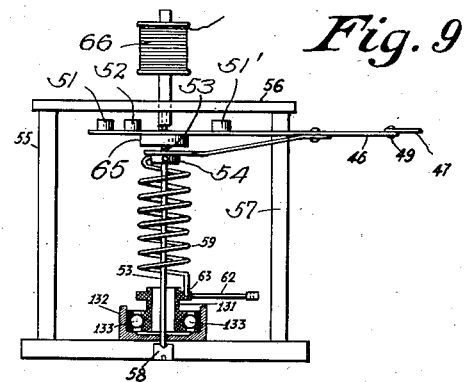

Fig. 6 conventionally illustrates the arrangement shown perspectively by Fig. 1;

Fig. 7 illustrates a preferred form of air valve construction;

Fig. 8 illustrates a portion of the cam arrangement for controlling the valve motion and is a sectional view taken on the line 8—8 of Fig. 2 looking in the direction of the arrows; and Fig. 9 illustrates a preferred mounting, partly in section, for the spring and spindle of Fig. 3.

Making reference to the accompanying drawings, we will first refer to Fig. 1 wherein the motor 1, which may be considered as any typical form of prime mover, is mounted at one end of a support or base member 2. An over-hanging portion of the motor shaft 3 is carried through an upstanding support 4 which serves as a bearing member for the over-hanging portion of the motor shaft. Current for driving the motor is supplied in the usual well known manner through leads 6 and 7 from A. C. or D. C. mains. Mounted at a point about midway of the extended portion of the motor shaft is a fly wheel 8 provided with hubs 9 through one of which a set screw 10 is placed for the purpose of attaching the fly wheel rigidly to the motor shaft. In practice we have found a hollow fly wheel filled with mercury to add weight to be most practical, although our invention is not to be confined to the specific use of this type of wheel since any type of flywheel may be used.

Extending outwardly from the bearing member 4 is a flat face disc member 11 of a diameter slightly less than that of the fly wheel 8, and this disc member is attached to the free end of the motor shaft in any convenient manner, for example by a set screw. Across the flat surface of the disc member 11 is a strip of spring steel 12 which is fastened at its ends 13 and 14 to diametrically opposite points on the said disc member. The steel strip 12 is provided at the points of fastening to the disc 11 with slots 15 and 16 for the purpose of permitting slight movement thereof upon an increase in motor speed. This piece of spring steel together with weights 17 and 18 which are attached to the same at points a slight distance from its mid-point will hereinafter be referred to as the centrifugal governor mechanism. The governor mechanism has attached to the mid-point of the piece of spring steel 12 a small rod or heavy wire 19 extending outwardly from a collar 20 attached to the strip 12 for a purpose to be hereinafter designated.

Supported upon a standard 21 is a valve mechanism 22 of a type similar to valve 45 shown by Fig. 7 having one end 23 connected with a supply of air 24 under pressure through a hose 25. Contained within the valve mechanism 22 is a valve member which may be of the ball type, as shown by Fig. 7. The ball is adapted to rest over the exit port of the valve and is held in the closed position by means of a spring held within the valve structure by a cap of any desired type as, for example, the cap 126 of Fig. 7. Making reference now to the rod or wire 19 extending from the mid-point of the centrifugal governor mechanism, it may be seen, upon rotation of the motor and with it through connection to the motor shaft 3 the fly wheel 8 and disc member 11, that the weights 17 and 18 carried by the spring steel strip 12 will tend to spread apart due to centrifugal force, and that the weights tend to assume a position approaching approximately 45° to the surface of the disc member 11, due to the fact that the ends of the strip, of spring steel, which support the said weights, are fastened by slot connections 15 and 16 to the disc. This tendency of the weights to assume a position different from that in a stationary position will tend to flex the piece of spring steel forming a portion of the governor and in doing so the rod or wire spindle 19 attached to the mid-point of the strip 12 is adapted, by reason of its extending into the valve mechanism 22, to force the ball off its seat or air exit port of the valve against the pressure of the spring above referred to, and permit air to pass through the entrance port 26 of the valve 22 and out through the exit port 27 through the hose member 28 and supply air to a bellows mechanism 29 mounted upon a standard 30 and placed at right angles and in close proximity to the fly wheel 8 attached to the motor shaft.

The bellows mechanism 29 above referred to, is adapted, upon opening of the valve 22 for supplying air thereto to expand and thus force a brake shoe 31, provided with a lining 32 of any preferred form of brake band material, to exert a pressure of sufficient force against the fly wheel 8 attached to the motor shaft, to slow down the motor or other form of prime mover. To prevent an undue air pressure being built up within the bellows member 29, due to the connection to the air supply, a leak valve 33, adapted to permit the air to gradually leak away from within the bellows 29, is attached to the said bellows 29. This valve is provided with a very small opening so that upon air rushing into bellows member 29 it will not prevent the bellows from acting to force the brake shoe against the fly wheel, but will permit the force of air built up within the bellows to gradually leak out. There is no other air exit except the leak valve for the air entering this bellows member.

Mounted upon the motor shaft at a point adjacent the bearing member 4 is a pinion 34 arranged to mesh with a gear 35 connected with a shaft 36 extending parallel to the motor shaft 3. The motor in turning is thus arranged to rotate the shaft 36, which will hereinafter be termed the cam shaft, at a reduced speed due to the fact that there is a speed reduction of at least two to one between the motor shaft 3 and cam shaft 36 through the gear train, comprising pinion 34 and gear 35. The gear 35 is attached near the end of cam shaft 36 which is supported by the bearing member 37. The opposite end of the cam shaft is supported by bearing member 38.

Upon the cam shaft 36 are mounted two cams 39a and 40a (see Figs. 2 and 8 for arrangement) one cam being for the purpose of driving the mechanical resonant system and the other for controlling an air valve both to be hereinafter described. Resting against the cam surfaces and in close contact therewith at all times, due to the action of heavy springs are cam rollers 39 and 40 mounted upon upstanding arms 41 and 42 which are pivotally supported from the base member 2. Connected on the arms 41 and 42 at a point between the cam rollers and the pivotal base mounting are the rod members 43 and 44 for controlling the mechanical resonant system and the valve member 45 as above referred to, and to be hereinafter described, respectively.

We will first attempt to describe the operation of the mechanical resonant system, which might also be termed a torsion pendulum mechanism or a balance of the general type used in watches. The mechanical resonant system, as a whole, is composed of an outreaching arm or balance 46 provided at its far end with a sector shaped plate 47, and is preferably composed throughout of a thin metallic strip so that the air resistance will be small and that the weight may be readily controlled. The sector plate 47 is preferably riveted, as at 48 to the end 49 of the outreaching arm 46 and is adapted to rest in the air gap of the open ported valve to be hereinafter described. This open ported air valve 50 is placed at right angles to the sector plate 47 attached to the arm 46 of the mechanical resonant system. Extending in the opposite direction from the end of the arm carrying the sector plate 47 the arm is provided with an over-hanging portion to which weights 51, 51' and 52 may be attached, if desired, for the purpose of regulating both the balance of the arm and the period of the arm swing, so that a delicate balance in all ways may be obtained. The arm 46 is clamped to an upstanding spindle 53 by means of a collar 54 attached to the said arm, through which the spindle member is adapted to pass and to which it is fastened by means of a set screw extending through the collar. The upper end of the spindle 53 for supporting the vibrating arm 46 passes through a frame work 55, 56, 57 adapted to form by means of the top piece 56 an upper support or ring bearing for the spindle, and at its lower end the spindle 53 rests in a cup shaped bearing member 58, which is preferably a jeweled bearing so as to form an anti-friction surface which permits easy swinging of the arm. The heavy coil spring member 59 surrounds the spindle 53 and has its upper end 60 fastened to a collar 61 which is clamped rigidly to the upper portion of the said spindle 53. The lower end of the spring 59 is fastened at 63 to a small plate member 62, to which is attached the rod 43 operated from the cam mechanism 39 hereinabove described. This construction is shown in detail by Fig. 9 and to refer to this figure it will be seen that the arm 62 at the point of connection of the spring 59 is formed as a short cylinder 131 and rests in a bearing member 132. In order to reduce friction of the cylindrical portion 131 of the arm 62 upon the bearing surface 132 a series of ball bearings 133 separates these two surfaces and provides a rolling contact therefor. This mounting, since the plate member 62 and its associated cylindrical portion 131, is free from the spindle so that any motion of the arm 62 will be translated to the spindle 53 only through the spring and its connection at 63' to the collar 54 is equivalent to a free mounting of one end of the spring or as it is herein termed "the mechanical resonant system". This attachment provides that any movement of the rod 43 by the cam roller 39, due to the cam 39a will move the plate member 62 and thus cause a torque in the spring coil 59 which tends to rotate the spindle 53 and through the fixed collar 54 will move the arm 46 about spindle 53 as an axis.

At a point about midway between the point of attachment 63 of the free end of the spring 59 and the rod 43 to the plate member 62 is fastened a second coil spring 64 having its other end fastened to an upstanding member 55 of the framework for supporting the balance arm 46, whereby the cam roller 39 attached to the swinging arm 41 and moved by rod 43 is at all times brought into contact with the cam surface 39a and all free play and lost motion in the connections to the cam is eliminated. From the above description it will be seen that for each rotation of the motor shaft 3 the cam shaft and cam 39a is adapted to turn a certain fractional part of one revolution, and that for several revolutions in the motor shaft the cam will be turned one or more times. Upon each complete revolution of the cam, the rod 43 operated from the cam roller 39 will be moved a slight amount back and forth, and this movement of rod 43 will be in turn translated into an angular motion by plate 62 moving about spindle 53 as an axis, and produce a winding and unwinding action in the heavy coil spring member 59 surrounding the spindle 53 which is connected to the said plate 62; and in turn the arm 46 will be carried back and forth by the action of the spring 59 tending to twist or rotate the vibrating arm 46 through a certain angle about the spindle 53 as an axis. As the pressure against the heavy spring member 59 is released when the cam 39a has turned a greater angular distance upon the cam shaft 36 it is seen that the rod 43 is no longer pushed to the left (looking at Fig. 3) and that the vibrating arm will tend to return to a position of rest by the force exerted upon it by the spring 59 tending to assume its normal position free from being expanded. Due to the fact that this is a mechanically resonant system, when the angular velocity of the cam is equal to a certain amount determined by the stiffness or natural period of vibration of the spring 59 and the inertia of the arm 46, the system is in resonance and energy will build up in the system when the desired motor speed is obtained. Therefore, a very slight movement of the rod 43, associated with the cam, will cause a considerable swing in the vibrating arm.

In addition to the fact that the amplitude of the swing varies for different angular velocities, the phase difference angle between the driving impulse from the cam acting through the rod 43 and spring 59 and the motion of the vibration arm also varies for various angular velocities of the cam shaft.

Also, attached to the vibrating arm at the point at which it is pivoted to the spindle 53 is a soft iron strip 65. Above this soft iron strip, and mounted upon the top plate 56 of the standard which forms the upper bearing support for the spindle member 53 is an electro-magnet 66 which may be energized through leads 67, 68 to attract the soft iron strip and cause it to tend to assume a position directly in line with the north and south magnetic poles, and thus increase the effective spring action upon the vibrating arm by tending to maintain the arm 46 fixed and thus accentuate the spring effect upon the arm at periods when the arm is at its greatest outward swing. This will, therefore, directly affect the resonant period of the swinging arm 46. The electrical means for controlling the arm member 46 forms no part of our invention only in so far as it cooperates with the remaining elements herein described, and it must be borne in mind that while electric means for controlling the period of the vibrating arm are herein set forth, these are no such means as would necessitate the rapid making and breaking of electric contacts in a speed control mechanism.

To now refer to the valve mechanism 45 hereinbefore mentioned, upon rotation of the second cam member 40a, the backward and forward movement produced in the cam roller 40 due to the shape of the cam 40a is translated through the rod 44 attached to the lever or arm 42 having its lower end point pivoted at 42a to the base member 2, to a lever 69, which has its mid-point pivotally supported at 70 by an upright pivot support 71, and its other end connected at 72 to a second rod 73 attached to the valve 45 in such a manner that rotation of the cam 40a will cause the said valve 45 to be opened and closed in a manner similar to that shown by Fig. 7. Attached at a point between the support 71 for the lever 69 and the rod 44 controlled by cam 40a is a spring member 74 connected at its opposite end to the support member 57. This spring 74 is adapted to keep the cam roller 40 at all times in contact with the cam surface 40a so that any movement of the cam is accurately translated through the rod and lever system to the air valve 45.

The valve 45 is shown specifically by Fig. 7 and is of a type similar to valve 22 hereinabove described in connection with the centrifugal governor. The valve 45, similar to valves 22 and 86, comprises a valve chamber 45' into which air enters at the entrance port 75' from the air hose 75 (see Fig. 1). Within the valve chamber 45' is a ball 120 resting upon the valve seat 121 leading into the valve exit port 76. The air entering the valve at the entrance port 75' tends to hold the ball 120 against the valve seat 121 but, in addition, a spring 122 is also provided for maintaining the ball in its proper place. The spring 122 at one end 123 thereof fits snugly around the ball 120 and at the other end 124 rests upon a conical seat 125 extending inwardly from the plug 126 which preferably screws into the valve chamber 45' and forms the end wall thereof. Extending through the opposite end of the valve 127 is a valve rod 73 which connects with the lever arm 62, as above described. The valve rod is adapted to move back and forth into the valve upon a movement of the cam roller 40 carrying the rod 44 back and forth and transferring its motion to the rod 73 through the lever 69. A stuffing box 128 fastened to the end 127 of the valve 45 prevents air leakage about the valve rod.

To now describe the valve operation it is seen that the end 129 of the valve rod 73 is adjacent the ball 120 and upon a movement of the valve rod to the left (looking at Fig. 7) the ball 120 is moved off the valve seat 121 against the pressure of spring 122 and the air entering the entrance port 75' passes through the valve and out through the exit port 76. Upon a movement of the valve rod to the right (looking at Fig. 7) both the air pressure from the air entering the valve chamber at 75' and the spring 122 at once push the ball 120 back upon the valve seat to close the air exit port 76.

From the above description it appears that any motion of the rod 73 by reason of connection through various rods to the cam roller 40 will move the ball 120 contained within valve 45 off its seat against the force of the spring 122, and permit air from supply 24 and air line 75 to pass through the valve and out through the valve exit port 76 and through pipe 77 into the open-port valve 50 adjacent the valve 45.

Figure 5:
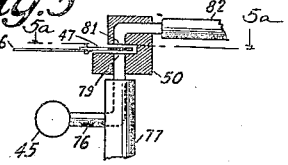
Fig. 5 is a cross section on the line 5—5 of Fig. 3 showing the air path through the open ported valve.

Under normal conditions the sector plate 47 attached to the vibrating arm 46 will have its edge portion 80 rest over the mid-point of the opening 79. For the purpose of explanation at present we will assume that the sector plate is moved to such a position that there is a free passage of air from the bottom side of the open-port member 50 to the top side provided at a point directly opposite the bottom opening 79 with a second opening 81 (see Fig. 5) so that air from exit port 76 will rush through the said open port valve 50 and through the two openings 79 and 81. Under this condition air from the supply passed through the valve member 45 will pass through both openings of the open-port valve 50 and out through the air hose 82 to a bellows member 83, to be hereinafter designated as an amplifying bellows. The air acting on this bellows member is adapted to expand the bellows and sufficiently move a pin 84 attached to the far side 85 of the bellows to force a ball within a valve 86, of similar characteristics to valve 45 above described, off the valve seat. This valve opening action will then permit air coming from the air supply 24 through the hose 87 to the valve 86 to have an unobstructed path through this valve to another air hose 88 from which it is directed to a third bellows member 89. This third bellows member may be briefly described in stating that its purpose is to modify the action of the centrifugal governor by aiding it in maintaining the desired prime mover speed. Upon entrance of the air into the bellows member 89, the bellows will expand a certain amount and force the collar 90 attached thereto outwardly toward the governor mechanism. The wire or rod 19 slides within the collar 90 and through the bellows 89 to operate the valve 22, and as the collar 90 moves toward the governor it will contact with the collar 20 attached to the spring steel strip 12 and thus aid in closing valve 22, since it will act at times when the prime mover speed is less than that desired, and, also, since the bellows will act even sooner than the governor mechanism, as may be seen by reference to the graphical analysis of our invention.

The details of the spring mechanism for vibrating the mechanical resonant system or balance arm and the details of the cam and gear mechanism provided for causing a movement of this spring member and for opening the valve associated with the open-port member are shown in the detailed views and further description of the same is believed unnecessary.

Figure 4:
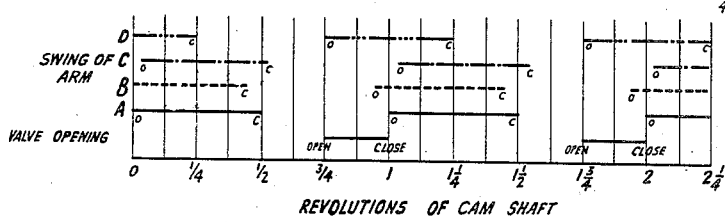
Fig. 4 is a graphical representation of the period of opening of the valve to supply air to the open ported valve, and the period of opening of the said open ported valve by the swinging of the vibrating arm.

Now making reference to Fig. 4 of the drawings, the conditions and operations are graphically set forth and will be herein described with reference to the graphical analysis, in addition to the previous description of the mechanism proper. Fig. 4 of the drawings is laid off with the abscissæ of the graph representing the proportional revolutions of the cam shaft. The solid and dotted lines represent the movement of the valve and mechanical vibrator systems for various speed conditions. In connection with this analysis it is to be understood that the governor mechanism is preferably adjusted so that it will operate at a slightly slower speed than that desired for the motor, although our invention is equally adaptable to identically opposite governor conditions. While the invention has been shown and claimed as relating to modifying the governor action where the prime mover speed is less than that desired, it is to be understood that this description has been given thus for the purpose of a concrete illustration and the invention in its broad scope is applicable to conditions where the governor mechanism is adjusted for conditions of slightly higher speed than that desired for the motor.

The rod and translating mechanism controlling the valve rod 73 is adapted to open the valve 45 for not more than ¼ revolution of the cam shaft and the period of valve opening is, therefore, a function of the shape of cam 40a. The period of valve opening has been graphically designated by a solid line as happening regularly between ¾ and 1 revolution and between 1¾ and 2 revolutions of the cam shaft. As herein before described, it is desired to have the sector shaped member 47 attached to the vibrating arm in zero position when its edge portion 80 occupies a point directly over the opening 79 into the open-port member 50 and for each revolution of the cam 39a by action of the rod 43 upon the heavy spring member 59 the motion of the cam is translated so as to cause the balance arm 46 to swing in such a fashion that it covers and uncovers the openings into the open-port member 50 alternately for each ½ revolution of the cam shaft. The uncovering action has been designated on the graphical analysis shown in Fig. 4 as happening between a position indicated from zero to ½ revolution, and again from 1 to 1½ revolutions of the cam shaft, and is intended to represent the time of opening and closing of the opening into the open-port member 50 by the letters O for opening and C for closing in each position which has been designated on Fig. 4 by "A", which is the ideal condition of operation. The ideal condition exists, however, only at the time when the angular velocity of the cam shaft is approximately equal that desired. However, due to the slight difference in the setting of the governor mechanism from the speed desired, the opening into the open ported member 50 does not occur at the moment of closing of the valve, but with the slight slowing of the motor, the action will occur just before the valve 45 closes, and air will consequently pass through the valve member 45, the open-ported member 50, the amplifying bellows 83, the valve mechanism 86 and the compensating or modifying bellows 89 and modify the action of the centrifugal governor so as to release the brake in the fly wheel. This situation is represented by position "B".

However, according to the third position of the vibrating arm, shown by position "C" on Fig. 4, if the motor is running too fast the valve 45 will have closed slightly before the time at which the lower opening 79 of the open-ported member 50 is uncovered, and air from the supply can not affect the bellows member 89 to modify the action of the centrifugal governor and the brake will be applied. Again, to, further analyze the situation, if we can consider the effect at starting, it will be seen that there is no phase lag whatever between the vibrating arm 46 and the valve opening 45 and that the opening to the open-ported member 50 will be uncovered for the entire period during which the valve 45 remains open, as shown by position "D". Therefore, it will be impossible for the brake mechanism to be applied since the governor can not open the valve 22 to supply air to the brake. As the motor gradually works up to normal speed the lag in the action of the sector plate 47 upon the open-port valve increases up to the position "A" which has been indicated as ideal. At this point the modifying action of the bellows 89 upon the governor no longer takes place. The slowing down action of the governor then takes place and the phase lag of the mechanical resonant system decreases, as shown by position "B". This decrease in phase lag causes air to enter the modifying bellows, which in turn modify the action of the governor. This action allows the motor to speed up. It is, however, conceivable that the motor may reach a speed greater than the normal or desired speed, which will increase the phase lag of the mechanical resonant system with respect to the valve opening, and a situation as represented by position "C" is produced. However, if the motor does not exceed the normal speed the phase lag does not exceed the position shown by representation "A". In either case the modifying action upon the governor will be momentarily discontinued and the brake applied. Thus, the motor speed will hunt slightly in the vicinity of the desired speed, and will be a close approximation thereto.

By Figure 6 we have shown a schematic arrangement of the system illustrated by Figure 1 for the purpose of disclosing clearly the method of operation of the system. In Figure 6 the various parts of the synchronizing device are numbered to agree with the showing of Figure 1 but all parts of the system are illustrated in conventional manner and are therefore not intended to represent actual constructions. It can be seen, however, from Figure 6 exactly how the arrangement of Figure 1 is intended to operate.

By proper design of the mechanical resonant and auxiliary parts, for example, cams, valves, and governor mechanism, we have been able to reduce the hunting action to a minimum.

This invention is to be considered as an improvement over the "Air driven motor control" application which was filed by Richard Howland Ranger as Serial #169,620 on February 19th, 1927, and it is to be understood to be within the contemplation of the invention that a system making use of the mechanical resonant system in the manner herein specified might be adapted to control a prime mover directly, or to correct the speed of an auxiliary speed governor directly for the purpose of controlling a prime mover. It is also within the contemplation of the invention to use steam or compressed gases to replace the air control, and while we have made specific reference to an air control throughout the specification the term is to be considered as generic to all equivalents and not as a specific or limiting term.

Having thus described our invention we are entitled to all modifications which fall fairly within its spirit and scope as defined in the following claims, wherein we claim:

1. A speed responsive device including a governor and a mechanical vibratory system for modifying the action of said governor.

2. A speed responsive device including a governor and a mechanically driven air system for modifying the action of said governor at periods when the speed of the prime mover is less than the normal speed.

3. A speed responsive device including a governor, a mechanical resonant system, an air controlled means for supplementing the action of said governor, and means controlled by said mechanical resonant system for supplying air to said supplementary governor control at periods when the prime mover speed is less than that desired.

4. In combination, a prime mover, a governor mechanism, means operable from said governor mechanism for controlling the speed of said prime mover, a mechanical resonant system operated from said prime mover, and means controlled by said mechanical resonant system for exerting a supplementary force upon said governor mechanism for secondary control of the speed of rotation of said prime mover.

5. In combination, a prime mover, a speed governing device, a brake associated with said prime mover, air means operable from said governing device for exerting a pressure on said brake, a secondary air supply, means operable from said prime mover for controlling said secondary air supply, a mechanically resonant system controlled by said prime mover, and means operable upon a change in phase lag between the control of said secondary air supply and the period of said mechanically resonant system for supplying an air pressure to modify the action of said governing device.

6. In combination, a prime mover, a governor mechanism for controlling the speed of said prime mover at periods when the speed of said prime mover is greater than normal, and a mechanical resonant system for controlling the speed of said prime mover at periods when the speed is less than normal.

7. In combination, a prime mover, a governor mechanism, a brake mechanism controlled from said governing mechanism, a mechanical vibratory system operated by said prime mover, said vibratory system including a balance arm and a heavy coiled spring controlled from said prime mover for swinging said balance arm, a valve mechanism, means for operating said valve mechanism from said prime mover, and means dependent upon the relative phase lag between said mechanical vibratory system and said valve mechanism operation for modifying the action of said governing mechanism.

8. In combination, a prime mover, a centrifugal governor mechanism driven thereby, means operated by said centrifugal governor mechanism to apply a braking force to said prime mover, an air valve, means operable from the rotation of said prime mover for opening and closing said valve at definite periods of the rotation of said prime mover, an open-ported valve connected with said air valve, a mechanical resonant system including an oscillating arm, means for driving said oscillating arm so that changes in the speed of said prime mover produce different angles of phase lag between said arm motion and the period of opening and closing of said valve member, said oscillating arm extending into said open-ported valve and adapted at definite periods of its oscillation to permit air to pass through said open-ported valve, and means operated by the relative phase lag between said mechanical resonant system and said valve opening and closing for supplying a force against said centrifugal governor mechanism, whereby the action of said governor upon the said prime mover is modified.

9. In combination, a prime mover, a fly-wheel driven thereby a brake associated with said fly-wheel, a centrifugal governor mechanism connected with said prime mover, a valve mechanism, means for supplying air to said valve mechanism, a bellows member associated with said valve mechanism and connected to said brake, means operable from said centrifugal governor for opening said valve whereby said air is passed to said bellows to apply said brake to said flywheel upon an increase in prime mover speed, a second valve mechanism connected with said air supplying means, means for opening and closing said second valve mechanism at definite periods during the rotation of said prime mover, an open-ported valve connected with said second valve, a mechanical resonant system for controlling the air flow through said open-ported valve, and means operated by the said air flow through said open-ported valve for modifying the action of said centrifugal governor.

10. In combination, a prime mover, a centrifugal governor mechanism connected with said prime mover, and means controlled by said centrifugal governor for applying a braking force to said prime mover upon an increase in speed above a predetermined normal value, a valve mechanism, a supply of air connected with one opening into said valve mechanism, an open-ported valve connected with the other opening of said valve mechanism, means controlled by said prime mover for opening and closing said valve mechanism at definite periods in the rotation of said prime mover, whereby air from said supply is passed through said valve mechanism to said open-ported valve, a mechanical vibratory system driven from said prime mover, means for causing said mechanical vibratory system to control the air flow through said open-ported valve, and means connected with said open-ported valve and controlled by the air flow therethrough for modifying the action of said governing mechanism at periods when the prime mover speed decreases below said predetermined value.

11. In combination, a prime mover, a governing device connected with said prime mover, and means controlled by said governing device for exerting a retarding force upon said prime mover upon an increase in speed above a predetermined value, a mechanical resonant system, said mechanical resonant system comprising an arm provided at its outer end with a sector-shaped plate member, a spindle mounting for said arm, a heavy coiled spring member surrounding said spindle and having one end fastened thereto, a plate member provided with a connecting point for the free end of said spring, said plate being adapted to swing about said spindle as an axis, means controlled by the rotation of said prime mover for swinging said plate, said plate movement being adapted to vibrate said arm and produce a vibration in said arm which lags the impulse from said prime mover by an amount dependent upon the period of said coiled spring member and the inertia of said arm, an open-ported valve, said open-ported valve being provided with a slotted portion through which said sector-shaped plate member extends, an air supply associated with said open-ported valve, means controlled by said prime mover for supplying air to said open-ported valve, and means dependent for operation upon the relative phase lag of said vibrating arm and the period of air supply to said open-ported valve for applying a modifying force upon the action of said governing mechanism, said modifying force being applied at periods when the prime mover speed falls below the said predetermined value.

12. The combination claimed in claim 11 wherein, said vibrating arm is provided with an extended portion, said extended portion extending in a direction opposite said sector-shaped member and beyond said spindle mounting, weight members slidably mounted upon the extended portion of said arm, said weights being adapted to increase the mechanical inertia of said vibrating arm.

13. The combination claimed in claim 11 wherein, said vibrating arm is provided with a strip of soft ferro-magnetic material, said material being carried upon said arm at the point of pivotal mounting to said spindle member, an electro-magnet positioned above said arm, and means for energizing said magnet, said magnet being adapted to increase the effective action of said coiled spring member upon said vibrating arm.

14. The combination claimed in claim 7 wherein, said balance arm is associated with an electro-magnet, and means for energizing said magnet whereby the effective action of said coiled spring upon said balance arm is increased.

15. The combination claimed in claim 7 wherein, said means for modifying the action of said governor includes, a bellows member and an air supply therefor, said air supply to said bellows being controlled by the relative phase lag between said mechanical vibratory system and said valve mechanism operation, a valve associated with said bellows, an air supply connected with said valve, means operable from the air pressure within said bellows member for opening said valve, a second bellows, said second bellows being supplied with air from said last named valve member, and means operable from said second bellows for exerting a force against said governor mechanism for modifying the same at periods when the prime mover speed falls below a fixed predetermined value.

16. In a speed control system, a prime mover, a governor associated with said prime mover, means operated from said governor for applying retarding force to said prime mover at periods when said prime mover speed is greater than normal, and air operated means controlled by said prime mover for applying a modifying force upon said governor at periods when the said prime mover speed is less than normal.

17. A speed control system including, a prime mover, a governor associated with said prime mover, an air system controlled by said governor for applying a retarding force upon said prime mover for predetermined conditions of prime mover speed, a second air system, a mechanical vibratory system for periodically interrupting the air supply in said second air system, means controlled by said prime mover for controlling the action of said mechanical vibratory system, a valve means also controlled from said prime mover for opening and closing said second air system, and means controlled by the phase relationship between the time of opening and closing of said second air system by said mechanical vibratory system and said valve means to permit air to pass beyond said second air system for applying a modifying force upon said governor at different predetermined conditions of speed.

18. A speed regulation system including, a prime mover, a governor mechanism associated with said prime mover, an air supply system, a mechanical resonant system driven from said prime mover for controlling said air supply system, a second means driven from said prime mover for controlling said air supply system, and means operated from air passing beyond said air supply system at periods of out of phase relationship between said mechanical resonant system and said second control for said air system for applying a modifying force upon said governor mechanism.

19. A speed control system including, a prime mover, a governor for controlling said prime mover, an air supply system, means operated from said prime mover for opening and closing said air supply system at predetermined intervals, a mechanical resonant system driven from said prime mover, said mechanical resonant system being arranged to open and close said air supply system in addition to said first named control at predetermined intervals, and means provided by said mechanical resonant system control of said air system for applying a modifying force upon said governor mechanism for controlling the prime mover speed at periods when the relative time relationship of said mechanical resonant system opening and closing of said air system and said prime mover opening and closing of said air system varies.

20. A speed control system including, a prime mover, a governor for controlling the speed of said prime mover, a mechanical resonant system, means for applying driving impulses to said mechanical resonant system from said prime mover, an air operated system for modifying the action of said governor upon said prime mover, and means for controlling said governor modifying air system in accordance with changes in the phase angle difference between conditions of resonance in said mechanical resonant system and the period of applying said driving impulses thereto.

21. A speed regulation system including, a prime mover, a mechanical vibratory system having a fixed and predetermined natural period of vibration, means driven from said prime mover for applying to said vibratory system driving pulses cophasal with said period of vibration of said vibratory system during periods of constant prime mover speed and out of phase driving pulses for changes in prime mover speed, an air operated system for controlling said prime mover speed, and means controlled by the phase relationship between said period of vibration of said vibratory system and said driving pulses for applying a modifying action to said speed control system.

22. A speed control system including a prime mover, a centrifugal governor associated with said prime mover, a brake means associated with said prime mover for applying a retarding force thereto, means controlled by said centrifugal governor for applying air to said brake for slowing said prime mover upon increases in speed beyond a predetermined value, a second air system, means for controlling said second air system from said prime mover, and means for applying said air in said second air system to said centrifugal governor for modifying the action of said governor upon said brake mechanism.

23. A speed control system including a prime mover, a centrifugal governor associated with said prime mover, a brake mechanism for applying a retarding force to said prime mover, an air system for applying said brake, means controlled by said centrifugal governor for applying said air to said brake, an air operated system for reducing the amount of air supplied to said brake at periods when said prime mover speed decreases below a predetermined value and a mechanical resonant system driven from said prime mover for controlling said air operated system.

24. A speed control system including, a prime mover, a mechanical vibratory system, comprising, a resilient element having a predetermined natural period of vibration, means for driving said vibratory system from said prime mover by applying impulses to said vibratory system at fixed predetermined periods of time, a speed control system for said prime mover, and a modifying means for said speed control, said modifying means including, an air operated system, and means for controlling the operation of said air system and confining the same to periods when there is an out of phase relationship between the natural period of vibration of said vibratory system and the driving impulse applied thereto from said prime mover.

25. A speed control system including, a prime mover, means for obtaining a substantially constant speed regulation thereon, a mechanical vibratory system driven from said prime mover, and means controlled from said mechanical vibratory system for modifying the action of said speed regulating means and obtaining the effect of a vernier adjustment of speed regulation on said prime mover for varying increases and decreases in prime mover speed from a fixed predetermined value.

26. In a speed control system, a prime mover, a centrifugal governor associated therewith, a brake means, air means controlled from said governor for applying a pressure upon said brake means for reducing the speed of said prime mover, a mechanical resonant system driven from said prime mover, an air supply system, and means for opening and closing said air supply system at predetermined periods of time with respect to said prime mover speed, a valve means for opening and closing said air supply system associated with said mechanical resonant system, and a means for modifying the action of said governor mechanism controlled from said air system at periods when there is a difference in the time of opening and closing of said air system by said first named opening and closing means and said mechanical resonant system opening and closing means in said air system.

27. A speed control system including, a prime mover, means associated with said prime mover for obtaining substantially constant speed regulation thereof, a mechanical vibratory system driven from said prime mover, an air supply system, means associated with said mechanical vibratory system for opening and closing said air supply system during predetermined periods of time, a valve means associated with said air supply system, means controlled from said prime mover for opening and closing said valve system and controlling the supply of air through said air supply system at predetermined periods of time, a modifying means for obtaining a secondary regulation of said prime mover speed driven from said air system, and means provided by said mechanical vibratory system control and said air valve control of said air system for passing air through said system to said modifying means during periods when the time of opening and closing of said air valves by said mechanical resonant system and said prime mover control vary in a predetermined relationship.

28. A speed control system including, a prime mover, a mechanical vibratory system having a fixed predetermined period of vibration, means driven from said prime mover for applying driving impulses to said mechanical vibratory system, said mechanical vibratory system including an arm, a spindle for mounting said arm and a spring means for driving said arm at the natural period of vibration of said system, an air supply system, means provided by the said arm of said vibratory system for opening and closing said air supply system at a rate corresponding to the natural period of vibration of said vibratory system, a valve for opening said air supply system and closing said air supply system at the instant of opening said air supply by the said arm of said vibratory system, whereby for constant speed said air supply system is maintained in closed position, and a modifying means associated with said air supply for modifying a speed control of said prime mover at periods when the said prime mover speed varies from a predetermined constant value and the period of valve openings in said air supply system overlaps.

29. The speed control system claimed in claim 28 including, in addition, electromagnetic means for controlling the period swing of said vibratory system.

30. A speed control system, including, a prime mover, a governor mechanism associated with said prime mover and means controlled from said governor mechanism for obtaining a coarse adjustment of speed of said prime mover for speed variations within a predetermined value; a mechanical resonant system including, a spindle, a spring carried by said spindle and having one end thereof rigidly mounted with said spindle and the other end free of said spindle, an arm carried by said spindle and fixed thereto to vibrate in accordance with the motion of said spindle, means driven from said prime mover for applying impulses to the free end of said spring whereby said mechanical resonant system is driven and permitted to vibrate at its natural period of vibration; a modifying system for modifying the action of said governor; an air supply system for driving said modifying system for said governor, a valve associated with said air supply system, means driven from said prime mover for opening and closing said valve at a predetermined rate governed in accordance with said prime mover speed, a second valve associated with said air supply system, means provided by said arm carried by said vibratory system for opening and closing said last named valve at definite periods with respect to the opening and closing of said first valve, and means provided by both of said valves whereby upon a difference in the phase relationship between the time of opening and closing of said valves air is supplied to said governor modifying system and a vernier adjustment of said prime mover speed is provided.

31. In a speed control system, a prime mover, a governor associated with said prime mover, means driven by said governor for obtaining a coarse adjustment of prime mover speed; a mechanical vibratory system including, a vibrating arm, a resilient member having one end rigidly associated with said arm and the other end freely suspended, means for applying driving impulses to the free end of said resilient member, said driving means being controlled from said prime mover and applying said impulses during fixed periods in the angular rotation of said prime mover; an air supply system, an open ported valve in said air supply system, means provided by said vibrating arm for opening and closing said open ported valve during periods corresponding to the natural periods of vibration of said resilient member, a second valve means associated with said air supply system, means driven from said prime mover for opening and closing said second valve means during definite periods in the angular rotation of said prime mover, a bellows associated with said air supply system, means provided by an overlapping in the time of opening of both of said valves for applying air to said bellows, and means provided by said bellows for applying a modifying force upon said governor whereby a vernier adjustment of prime mover speed is obtained.

32. The system claimed in claim 31 including, in addition, means for varying the natural period of vibration of said vibrating arm.

33. The system claimed in claim 31 comprising in addition, electromagnetic means for applying a corrective factor to the period of vibration of said vibrating arm.

34. The system claimed in claim 31 comprising, in addition, a booster bellows associated with said air supply system for aiding the action of said modifying bellows upon said governor.

35. In a speed regulator system, speed responsive means for retarding an element to be regulated when the speed thereof is above a predetermined normal speed, and vibratory means for causing said first named means to become inoperative when the speed of said element is below said predetermined normal speed.

36. In a speed regulator system, speed responsive means for retarding an element to be regulated when the speed thereof is above a predetermined normal speed, and vibratory speed responsive means for causing said first named speed responsive means to become inoperative when the speed of said element is below said predetermined normal speed.

RICHARD HOWLAND RANGER.
VERNE T. BRAMAN.
CARL ERIC NELSON.